(12) United States Patent
Doake et al.

(10) Patent No.: US 6,955,031 B2
(45) Date of Patent: Oct. 18, 2005

(54) MUSHROOM PACKING APPARATUS

(75) Inventors: Ivan Doake, County Down (GB); Neville Doake, County Down (GB)

(73) Assignee: Axis Systems Limited (GB)

( * ) Notice: Subject to any disclaimer, the term of this patent is extended or adjusted under 35 U.S.C. 154(b) by 0 days.

(21) Appl. No.: 10/363,592

(22) PCT Filed: Sep. 4, 2001

(86) PCT No.: PCT/EP01/10243

§ 371 (c)(1),
(2), (4) Date: Jul. 30, 2003

(87) PCT Pub. No.: WO02/20355

PCT Pub. Date: Mar. 14, 2002

(65) Prior Publication Data

US 2004/0099467 A1 May 27, 2004

(30) Foreign Application Priority Data

Sep. 4, 2000 (GB) .............................. 0021728

(51) Int. Cl.[7] .............................. B65B 1/32; B65B 3/28
(52) U.S. Cl. .............................. 53/502; 53/244; 53/250; 53/504; 53/542
(58) Field of Search ......................... 53/244, 250, 251, 53/252, 502, 504, 542; 56/327.1, 328.1; 450/123, 144, 145, 149, 150

(56) References Cited

U.S. PATENT DOCUMENTS

| | | | | |
|---|---|---|---|---|
| 2,552,620 A | * | 5/1951 | Christian | 53/448 |
| 2,720,039 A | * | 10/1955 | Brown | 434/4 |
| 3,164,182 A | * | 1/1965 | Hughes et al. | 99/637 |
| 3,859,774 A | * | 1/1975 | Bausch | 53/167 |
| 3,972,487 A | * | 8/1976 | Costa | 242/558 |
| 3,990,212 A | * | 11/1976 | Flodin | 53/502 |
| 4,094,413 A | * | 6/1978 | Altenpohl et al. | 209/592 |
| 4,677,283 A | * | 6/1987 | Lewis | 235/98 C |
| 4,717,307 A | * | 1/1988 | Ciuffetelli | 414/300 |
| 5,234,375 A | | 8/1993 | Hendriks | 460/135 |

OTHER PUBLICATIONS

International Search Report for PCT/EP01/10243 dated Sep. 4, 2001.

* cited by examiner

Primary Examiner—Stephen F. Gerrity
Assistant Examiner—Hemant M. Desai
(74) Attorney, Agent, or Firm—Van Dyke, Gardner, Linn & Burkhart, LLP

(57) ABSTRACT

The present invention provides a mushroom packing apparatus comprising a grading conveyor and a plurality of locations distributed under a longitudinal axis of the grading conveyor, each location being provided, in use, with a container for collecting the mushrooms as they are deposited from the grading conveyor. The apparatus is arranged to weigh the respective container at each location and to facilitate removal of the loaded container once the loaded container has reached a predetermined weight, the apparatus being further adapted to replace each loaded container with an empty container once the respective loaded container has reached a predetermined weight.

15 Claims, 3 Drawing Sheets

MUSHROOM PACKING APPARATUS

This application is National Stage of PCT/EP01/10243 filed on Nov. 04, 2001.

TECHNICAL FIELD AND BACKGROUND OF THE INVENTION

The present invention concerns a mushroom packing apparatus.

Although the apparatus of the present invention is primarily intended for use in the grading and packing of mushrooms, it will of course be understood from the following description that said apparatus would equally be suited for use with similar delicate items which conventionally require grading and packing.

It is a well established practice in the trade of mushroom growing to provide custom built growing houses in which the mushrooms may be grown in a carefully maintained environment. Each growing house conventionally contains rows of growing beds containing compost, on which the mushrooms are grown. The rows of growing beds are separated by passages running therebetween. Therefore, when harvesting the mushrooms, pickers travel along the passages between said rows, picking the mushrooms and depositing them in a basket or similar container for subsequent sorting and packing.

It is also known in the art to provide a custom built trolley having a conveyor on which the picked mushrooms are deposited, the trolley further including a number of containers into which the mushrooms are deposited from the conveyor. The conveyor is arranged to grade the mushrooms by size, such that each container includes only mushrooms within a given size range. Once one of the containers has been filled with mushrooms, the picker must cease picking, remove the container from the trolley, and deposit the container in a suitable location for further processing, for example, weighing to determine if the correct market weight of mushrooms has been loaded into the container. If said weight has not been achieved, or indeed if it has been surpassed, the contents of the container must be suitably adjusted.

Having removed the filled container from the trolley, the picker must then get an empty container and position it on the trolley in place of the filled container which has been removed. Once this has been effected, the picker may resume picking mushrooms from the bed. It will therefore be appreciated that the picker must also continually observe the containers in the trolley, while simultaneously trying to pick mushrooms, in order to ensure that none of the containers overflow.

SUMMARY OF THE INVENTION

It is therefore an object of the present invention to provide a mushroom packing apparatus which is capable of weighing each of the plurality of containers of mushrooms as the respective container is being filled, and to facilitate the automatic removal of the container to permit an empty container to be located in place of the filled container.

It is a further object of the present invention to provide a mushroom packing apparatus which automatically replaces a filled container with an empty container.

The present invention therefore provides a mushroom packing apparatus comprising a grading conveyor; a plurality of locations distributed under a longitudinal axis of the grading conveyor, each location being provided, in use, with a container for collecting the mushrooms as they are deposited from the grading conveyor; characterised in that the apparatus is arranged to weigh the respective container at each location and to facilitate removal of the loaded container once the loaded container has reached a predetermined weight.

Preferably, each location includes a weighing pan on which, in use, the respective container is seated.

Preferably, the apparatus replaces each loaded container with an empty container once the respective loaded container has reached a predetermined weight.

Preferably, each location comprises a transporter in operative association, in use, with the respective container, the transporter being arranged to transfer the container, when loaded, from beneath the grading conveyor and to locate an empty container beneath the grading conveyor.

Preferably, each weighing pan is shaped and dimensioned to support an empty container adjacent the, in use, container being loaded, the transporter operable to reversibly displace the weighing pan such that the loaded container is transferred from beneath the grading conveyor, while the empty container is simultaneously transferred beneath the grading conveyor.

Preferably, each location includes a support table located above and out of contact with the respective weighing pan, the support table being in operative association with the transporter such that the support table is maintained above the weighing pan as the weighing pan is reversibly displaced.

Preferably, the apparatus includes a stop associated with each location, the stop arranged to engage, in use, the respective empty container when located beneath the grading conveyor, such as to hold the empty container beneath the grading conveyor as the transporter retracts the weighing pan.

Preferably, the stop is further arranged to engage the respective loaded container once the loaded container has been transferred from beneath the grading conveyor, such as to prevent the loaded container from being drawn back beneath the grading conveyor as the transporter retracts the weighing pan.

Preferably, the apparatus is provided with a magazine in operative association with each location, each magazine containing, in use, a number of empty containers, the magazine being adapted to deposit an empty container at the respective location as required.

Preferably, the apparatus includes a lateral conveyor which runs adjacent each location, onto which lateral conveyor the transporter deposits the loaded containers, in order that the loaded containers may be conveyed from the apparatus.

Preferably, the apparatus includes a storage compartment into which the lateral conveyor feeds the loaded containers.

Preferably, the storage compartment is removably secured to the apparatus.

Preferably, the apparatus is shaped and dimensioned to pass between adjacent rows of mushroom beds in a mushroom house.

Preferably, once a predetermined number of empty containers within any of the magazines has been reached, a warning signal is generated to alert an operator that the respective magazine requires refilling.

Preferably, the apparatus includes a controller adapted to halt the grading conveyor while any loaded container is being replaced with an empty container, and to restart the grading conveyor once said replacement has been effected.

Preferably, a warning signal is generated once a predetermined number of loaded containers have been deposited in the storage compartment.

Preferably, the apparatus is mobile in order to permit the apparatus to be driven between the rows of mushroom beds.

Preferably, the apparatus includes sensors adapted to guide the apparatus, as the apparatus is driven, between the rows of mushroom beds.

As used herein, the term "grading conveyor" is intended to mean a conveyor for transporting items of a range of sizes, the conveyor being adapted to deposit items at appropriate locations along the length of the conveyor, dependent on the size of those items, such a loading conveyor generally taking the form of a pair of oppositely disposed endless belts, the spacing between the belts gradually increasing along the length thereof.

As used herein, the term "transporter" is intended to embrace any mechanical means capable of transferring a container from a first position to a second position and back again, the transporter preferably being in the form of a table on which the container is supported, the table being capable of reciprocating linear translations which are effected by conventional mechanical/hydraulic/pneumatic means.

As used herein, the term "magazine" is intended to mean a compartment attached to a machine, in which one or more items are stored, the compartment adapted to feed the items to the machine in a suitable fashion.

As used herein, the term "mushroom bed" is intended to mean compost bags, compost blocks, trays or shelves containing compost or the like, or any other similar growing systems in which mushrooms are grown, the beds generally being arranged in elongate rows having corresponding passages therebetween, which passages allow access to the beds for the purpose of harvesting the mushroom.

DETAILED DESCRIPTION OF THE DRAWINGS

The present invention will now be described with reference to the accompanying drawings, in which.

DETAILED DESCRIPTION OF THE PREFERRED EMBODIMENTS

Figure 1:
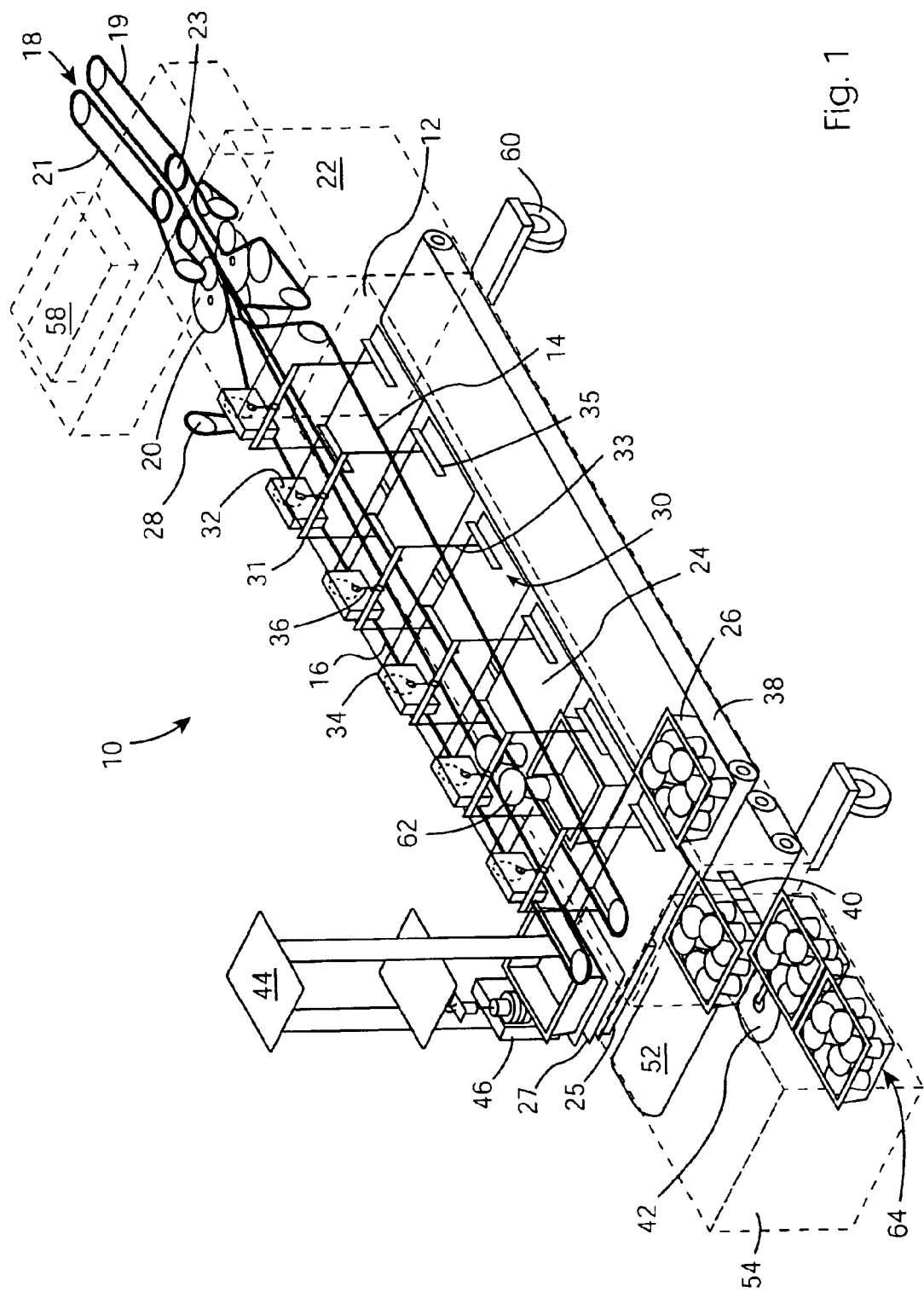
FIG. 1 illustrates a perspective view of the device according to the present invention.

Referring now to the accompanying drawings, there is illustrated a mushroom packing apparatus, generally indicated as 10, for expediting the processing and packing of mushrooms 62. The apparatus 10 consists mainly of a base 12 mounted on a plurality of wheels 60, thereby allowing the apparatus 10 to be manoeuvred through a mushroom house (not shown). The base 12, in FIG. 1 of the drawings, is shown in dotted outline, and has been completely omitted from FIG. 2 for the purposes of clarity. Located at a leading edge of the apparatus 10 is a loading conveyor 18 consisting of a first arm 19 and a second arm 21 in parallel spaced relation. The mushrooms 62, once picked, are placed on the loading conveyor 18 such that the cap is supported by the first arm 19 and the second arm 21, with the mushroom stalk suspended between the first arm 19 and the second arm 21. The loading conveyor 18 is capable of swivelling from side to side about a pair of pivot pulleys 23 in order to be in close proximity to either mushroom bed (not shown) defining the row (not shown) along which the apparatus 10 is drawn. The first and second arms 19, 21 are adapted to remain parallel to one another as the loading conveyer 18 is drawn through an arc about the pivot pulleys 23.

The mushrooms 62 proceed along the loading conveyor 18, extending from and contiguous with the end of which is a first feed belt 14 and a second feed belt 16, again in opposed spaced relation to one another. Both the first feed belt 14 and the second feed belt 16 are endless belts which, at adjacent respective faces thereof, are uni-directional in motion. The mushrooms 62 are therefore supported by the first feed belt 14 and the second feed belt 16 in a manner identical to that of the loading conveyor 18, and are drawn therealong in the direction of movement of the adjacent respective faces of the first feed belt 14 and the second feed belt 16. After passing from the loading conveyor 18 to the first and second feed belts 14, 16, the mushrooms 62 traverse a pair of rotary blades 20 located beneath the first and second feed belts 14, 16. The rotary blades 20 remove the roots (not shown) from the mushrooms 62, which are deposited in a root bin 22 located beneath the rotary blades 20. It will nonetheless be appreciated that any other suitable means, mechanical or otherwise, for removing the roots and/or stalk (not shown) may be adopted in place of the rotary blades 20. The root bin 22 is shown in dotted outline in FIG. 1, and has been completed omitted from FIG. 2 for the purposes of clarity.

The opposing respective lengths of the first feed belt 14 and the second feed belt 16 are positioned relative to one another such that the gap located therebetween increases in width along the direction of travel of the first and second feed belts 14, 16. It will therefore be appreciated the once the gap between the first and second feed bets 14, 16 increases beyond the diameter of the cap of a mushroom 62, the mushroom 62 will drop between the first and second feed belts 14, 16. It will also be understood that the mushrooms 62 will vary in size from one to the next, the orientation of the first and second feed belts 14, 16 thereby causing mushrooms 62 of different size to pass between the first and second feed belts 14, 16 at various positions corresponding to the size of the mushrooms 62. The first and second feed belts 14, 16 are therefore arranged to grade the mushrooms 62 and release them at predetermined locations along the length thereof.

Located beneath the first and second feed belts 14, 16 are a plurality of weighing pans 24 each of which, in use, have a container, preferably such as a punnet 26 located thereon for receiving the mushrooms 62 as they drop between the first and second feed belts 14, 16. In both FIGS. 1 and 2 of the drawings, only one of the weighing pans 24 is shown with a punnet 26 located thereon. The first and second feed belts 14, 16 are arranged such that at the first weighing pan 24, the space therebetween has been set to match the cap diameter of the smallest mushrooms 62 being picked, and at the last weighing pan 24 the largest mushrooms 62 being picked. In the present embodiment of the invention the apparatus 10 includes six weighing pans 24 and respective punnets 26, thereby separating the mushrooms 62 into six individual size brackets. It will however be appreciated that the apparatus 10 may be configured to include any number of weighing pans 24 and punnets 26, to suit the size of the mushrooms 62 being picked and packaged. The orientation of the first and second feed belts 14, 16 must be adapted to suit the number of weighing pans 24 included in the apparatus 10, in addition to the range of sizes of mushrooms 62 being picked. The apparatus 10 is therefore provided with a control unit 58 incorporating a visual display (not shown) and user interface (not shown) which allows the operator to monitor the various functions of the apparatus 10. The control unit 58 allows an operator to vary the space between the first and second feed belts 14, 16 via the user interface (not shown). Alternatively, the necessary adjustment may be made manually to the first and second feed belts 14, 16.

The weighing pans 24 monitor the weight of each individual punnet 26 as it is filled with mushrooms 62. Each weighing pan 24 has a load cell (not shown) located therebeneath, on which the respective weighing pan 24 is seated, each load cell (not shown) being connected to the control unit 58 in order to allow the control unit 58 to monitor the weight of each individual punnet 26. Once a predetermined weight has been reached, the apparatus 10 is adapted to remove the respective punnet 26 and replace the filled punnet 26 with an empty punnet 26. The punnets 26 are preferably chosen such that, when full with mushrooms 62, they are market ready. The predetermined weight for each filled punned 26 can be set via the user interface (not shown) of the control unit 58.

Figure 2:
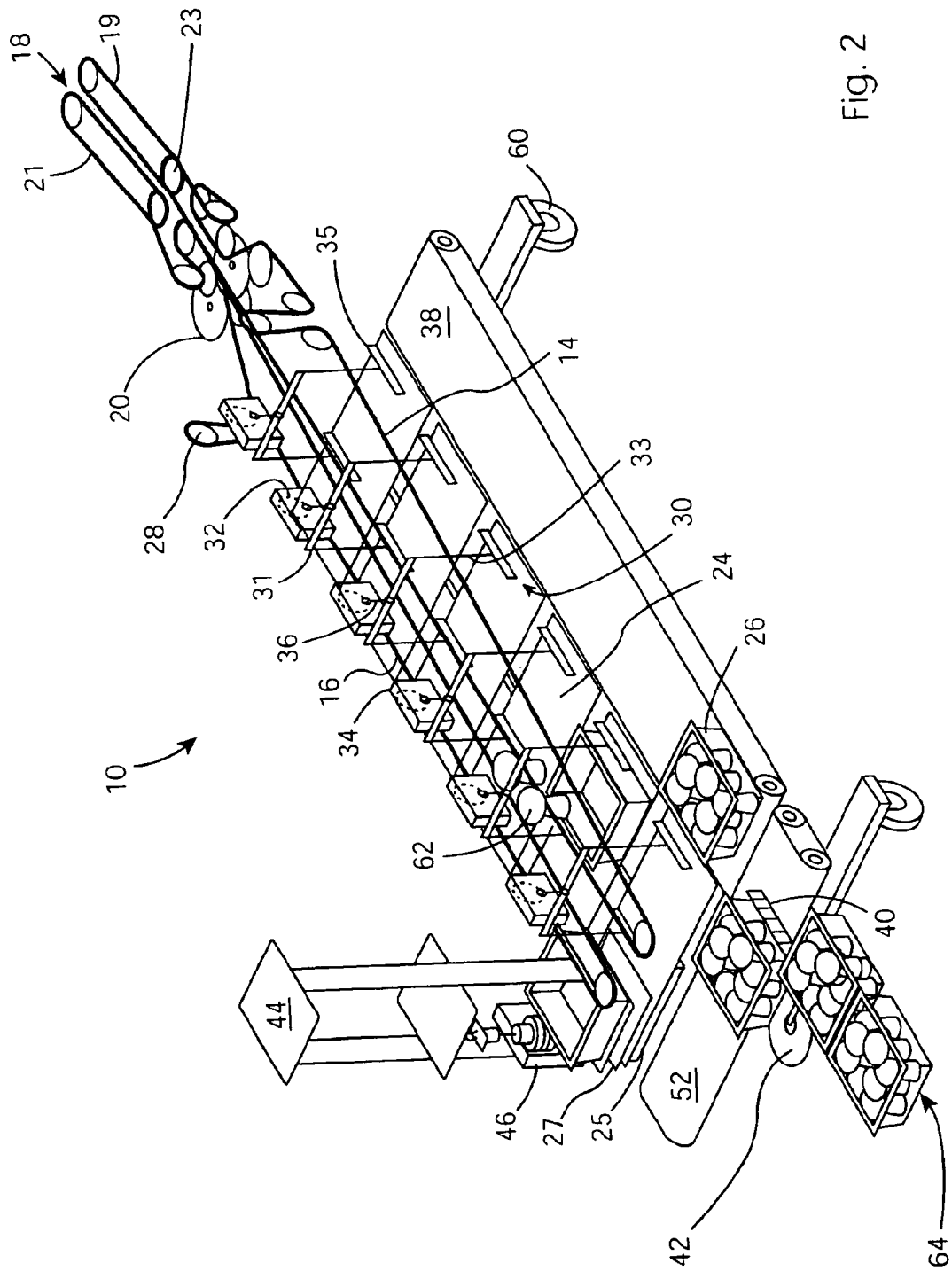
FIG. 2 illustrates the apparatus of FIG. 1 having several components omitted for the purposes of clarity.

The apparatus 10 is provided with a plurality of magazines 44, the number of which corresponds to the number of weighing pans 24 present, each magazine 44 capable of holding a plurality of empty punnets 26. Each magazine 44 is also adapted to be capable of housing and dispensing punnets 26 of different sizes. In FIGS. 1 and 2 only a single magazine 44 is shown, located adjacent the end weighing pan 24. Each magazine 44 is located adjacent a respective weighing pan 24. In use, each magazine 44 incorporates a pair of oppositely disposed feeders 46, one of which has been removed in both FIGS. 1 and 2 for clarity. The feeders 46 are adapted to deposit a single punnet 26 from the respective magazine 44 as required, as is described hereinafter in detail. In use, once a first preset number of punnets 26 within each magazine 44 has been reached, a warning light (not shown) is illuminated in order to alert an operator that the respective magazine 44 will shortly require refilling with empty punnets 26. A warning buzzer (not shown) will then sound if a lower preset limit of empty punnets 26 within the magazine 44 is reached. The control unit 58 will halt the feed belts 14, 16 if the punnets 26 within any magazine 44 run out. At this point a signal may be transmitted to a remote terminal (not shown), requesting a fresh supply of empty punnets 26. The control unit 58 may further be adapted to transmit to the remote terminal (not shown) such information as the total number of punnets 26 filled by the apparatus 10; the weight of each punnet 26; the average weight of the punnets 26; the combined weight of mushrooms 62 packed by the apparatus 10; an operator identification number or the like, etc.

Figure 3:
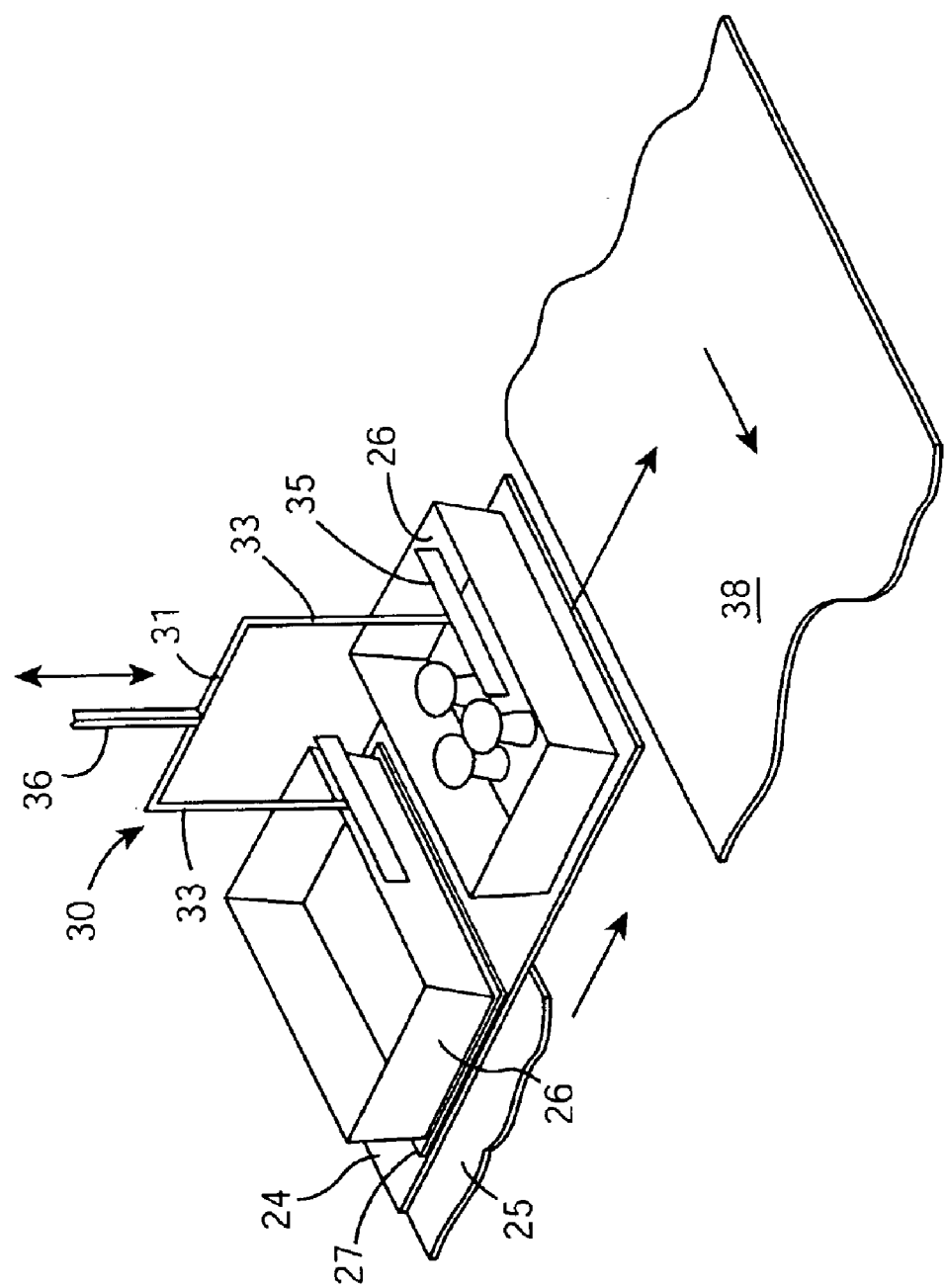
FIG. 3 illustrates a perspective view of one of six weighing pans and associated components forming part of the apparatus of the invention.

In order to effect replacement of a full punnet 26, the apparatus 10 includes a plurality of selectors 30, each weighing pan 24 having a selector 30 in operative association therewith. The selectors 30 comprise a crossbar 31, a pair of lateral arms 33 extending substantially vertically downward from the crossbar 31, each arm 33 incorporating a stop 35 extending substantially perpendicularly from the free end thereof. Each selector 30 is arranged and dimensioned such that the feed belts 14, 16 pass beneath the crossbar 31 and between the pair of lateral arms 33, thereby preventing the mushrooms 62 from fouling the selectors 30 as the mushrooms 62 traverse the feed belts 14, 16 and drop into the punnets 26. In FIG. 3, it can be seen that the feed belts 14, 16 have been omitted for the purposes of clarity. Each selector 30 is mounted to the apparatus 10 via a link 36, to a selector cam 32 driven by a selector motor 34. The selector motor 34 is arranged to rotate the selector cam 32 in order to effect elevation of the selector 30 to the extent that the stops 35 are located distal the respective weighing pan 24 a distance greater than the depth of the punnet 26, as shown in FIG. 3, the application of which is hereinafter described.

The plurality of weighing pans 24 are mounted on a transporter 25 which is substantially planar in form and is located adjacent to and co-planar with the lower face of each of the plurality of weighing pans 24, the transporter 25 being capable of a reversible translation, by conventional mechanical/pneumatic/hydraulic means (not shown), across the base 12 such that the weighing pans 24 extend outwardly over a lateral conveyor 38. Therefore, in use, at the start-up of the apparatus 10, prior to an operator feeding mushrooms 62 onto the loading conveyor 18, the respective feeder 46 lowers an empty punnet 26 from each magazine 44 onto a support table 27 located directly beneath the respective magazine 44. Each support table 27 is secured to the transporter 25 but is maintained above and out of contact with the respective weighing pan 24 located beneath said support table 27. In both FIGS. 1 and 2 only a single support table 27 is shown beneath the single magazine 44 shown, although it will be understood that each weighing pan 24 has a support table 27 associated therewith. At this point each of the selectors 30 are in the raised position as shown in FIG. 3, and the transporter 25 is driven across the base 12, thereby moving each of the empty punnets 26 into position beneath the respective raised selector 30, and the feed belts 14, 16. Each of the selectors 30 is then lowered, and the transporter 25 is then driven back across the base 12. The plurality of support tables 27 therefore return with the transporter 25, and as the empty punnets 26 are held between the respective pair of stops 35, the support tables 27 are drawn from beneath the empty punnets 26, at which point the empty punnets 26 drop onto the weighing pans 24. The control unit 58 then zeroes the reading shown for the weight of each of the weighing pans 24, such that, on mushrooms being deposited in the plurality of punnets 26, only the weight of the mushrooms 62 themselves will register, as opposed to the combined weight of the mushrooms 62 and the respective punnet 26. Each of the selectors 30 are then moved to the raised position, prior to operation of the apparatus 10.

Each magazine 44 then deposits a further empty punnet 26 onto the support table 27 located therebeneath, at which point the apparatus is ready for operation. As each support table 27 is located above and out of contact with the respective weighing pan 24, the empty punnet 26 deposited thereon will not affect the reading for the weight shown on the respective weighing pan 24. The loading conveyor 18 and the first and second feed belts 14, 16 may therefore be activated by means of the user interface (not shown), and mushrooms 62 are deposited onto the loading conveyor 18 to be deposited into the plurality of punnets 26 located beneath the feed belts 14, 16, as hereinbefore described.

Therefore, during use, mushrooms 62 are continually fed to the apparatus 10, which are graded into the plurality of punnets 26 located on the weighing pans 24, the weight of mushrooms on each of the weighing pans 24 being carefully monitored by means of the respective load cell (not shown) and the control unit 58. Once the predetermined weight had been reached in any of the punnets 26, the apparatus 10 effects removal and replacement of said full punnet 26. The loading conveyor 18 and the feed belts 14, 16 are therefore halted momentarily, and the transporter 25 is driven across the base 12, as hereinbefore described. This thus results in each of the empty punnets 26 located on the plurality of support tables 27 being transferred beneath the feed belts 14, 16, such that the feed belts 14, 16 can be reactivated to continue grading the mushrooms 62 into said empty punnets 26 now in position beneath the feed belts 14, 16. In addition, the plurality of punnets 26 located on the weighing pans 24 are now located above the lateral conveyor 38. At this stage the selector 30 associated with the full punnet 26 to be removed is lowered about the empty punnet 26 on the respective support table 27, such that the pair of stops 35 are disposed on either side of said empty punnet 26. Once the selector 30 has been lowered, the transporter 25 is driven back across the base 12, during which translation the loading conveyor 18 and the feed belts 14, 16 are again momentarily halted.

As all of the selectors 30, except the selector 30 associated with the full punnet 26 to be replaced, are still in the raised position, as the transport 25 returns across the base 12, the respective punnets 26 on the support tables 27 and on the weighing pans 24 will be drawn back into their original positions beneath the magazines 44 and the selectors 30 respectively. However, the punnet 26 located between the stops 35 of the lowered selector 30 is maintained in position as the support table 27, drawn by the transporter 25, slides along therebeneath. Furthermore, as the transporter 25 and weighing pans 24 return, the full punnet 26 to be replaced will engage the outer stop 35 of the lowered selector 30, preventing the full punnet 26 from returning beneath the feed belts 14, 16. The weighing pan 24 will therefore be drawn from beneath the full punnet 26, causing the full punnet 26 to drop onto the lateral conveyor 38. In a similar fashion, the support table 27 will be drawn from beneath the empty punnet 26 held by the lowered selector 30, and as hereinbefore described, will therefore drop onto the corresponding weighing pan 24. It will therefore be appreciated that one or more mushrooms 62 may have been deposited into the empty punnet 26 prior to the empty punnet 26 being drawn from the support table 27 onto the weighing pan 24. However, as the control unit 58 initially zeroed each weighing pan 24 such as to disregard the weight of an empty punnet 26, once the aforementioned punnet 26 drops onto the weighing pan 24, said empty weight will be automatically subtracted so that only the weight of the mushrooms 62, if any, located therein will be registered by the weighing pan 24.

It will thus be appreciated that the full punnet 26 has been replaced with an empty punnet 26, the full punnet 26 now being located on the lateral conveyor 38. The support table 27 from which the empty punnet 26 has been transferred therefore requires an empty punnet 26 to be deposited thereon, in anticipation of the next replacement sequence. An empty punnet 26 is therefore deposited onto said support table 27 from the respective magazine 44. The apparatus 10 thus continues to grade the mushrooms 62 until another punnet 26 reaches the predetermined filled weight, at which point said punnet 26 will be replaced as hereinbefore described.

As described, the full punnet 26 is therefore located on the lateral conveyor 38 and, depending on the location of the full punnet 26, the control unit 58 advances the lateral conveyor 38 a predetermined distance in order to bring the punnet 26 to the end of the lateral conveyor 38 and onto an end conveyor 52. Extending rearwardly from the end conveyor 52 is a storage compartment in the form of a storage rack 54 divided into a plurality of rows 64. Once a punnet 26 is fed from the lateral conveyor 38 to the end conveyor 52, the control unit 58 deactivates the lateral conveyor 38 and activates the end conveyor 52, such that the punnet 26 is transferred onto the storage rack 54.

Filled punnets 26 are continually transferred to the storage rack 54 as hereinbefore described, and once a single row 64 has filled with punnets 26, a slider 40, driven by a slider motor 42 which is operated by the control unit 58, moves the incoming punnets 26 across the end conveyor 52 into register with an empty row 64. The slider motor 42 may be mounted to the storage rack 54, or alternatively may be mounted to the base 12 beneath the end conveyor 52. The end conveyor 52 is then activated by the control unit 58, the punnet 26 within the slider 40 therefore being transferred into the empty row 64 of the storage rack 54. This operation is continued until the entire storage rack 54 contains filled punnets 26, or alternatively, until all of the mushrooms 62 have been picked. Each of the punnets 26 is a predetermined weight and is ready to be transferred directly to market, thereby greatly reducing the cost and time associated with post processing of picked mushrooms.

In an alternative arrangement, the sequence of events may be varied such that when a full punnet 26 reaches the end conveyor 52, the slider 40 transfers the punnet 26 to the opposed end thereof, but the end conveyor 52 is not activated. The next punnet 26 to reach the end conveyor 52 is then positioned, by means of the slider 40, adjacent the previous punnet 26. This operation is continued until the entire length of the end conveyor 52 is filled with punnets 26. At this point the end conveyor 52 is activated in order to transfer the punnets 26 into the respective rows 64 of the storage rack 54.

In a further embodiment, the storage rack 54 may be arranged and dimensioned as a vertical rack (not shown) having one or more rows (not shown) extending substantially perpendicularly to the end conveyor 52.

As an optional component, the apparatus 10 may be provided with a label printer (not shown) or the like which is in communication with the control unit 58. The label printer (not shown) would preferably be located at or adjacent the storage rack 54 and be arranged to locate a label (not shown) on each filled punnet 26, which label (not shown) may carry various information such as the weight of mushrooms 62 within the punnet 26, the date and location of picking, etc. It will also be appreciated that, in an alternative arrangement, an individual transporter (not shown) may be provided for each weighing pan 24, each transporter (not shown) capable of movement independent of the remaining transporters (not shown). The transporter (not shown) may be in the form of a hydraulic/pneumatic ram (not shown) which is arranged, for example, to push the empty punnet 26 located on the support table 27 towards the full punnet 26 on the corresponding weighing pan 24. The empty punnet 26 will therefore push the full punnet 26 from beneath the feed belts 14, 16 onto the lateral conveyor 38, to be replaced by the empty punnet 26. This particular arrangement would therefore permit omission of the plurality of selectors 30 and associated selector cams 32 and selector motors 34. It will of course be immediately understood that any other suitable means of replacing a full punnet 26 with an empty punnet 26 could be substituted for the transporter 25 and selectors 30 of the present embodiment.

In a still further embodiment, the plurality of support tables 27 may be omitted from the apparatus 10 such that punnets 26 are deposited directly from the magazines 44 onto the weighing pans 24. In such an embodiment, the reading from each weighing pan 24 for the weight thereon is zeroed after the start-up sequence as hereinbefore described, once a pair of empty punnets 26 are located on each weighing pan 24. However, the loading conveyor 18 and the feed belts 14, 16 must be halted for the entire duration of the punnet 26 replacement sequence. This is because the weight recorded for each weighing pan 24 would otherwise continue to rise as mushrooms 62 were deposited into the empty punnets 26 during the period when the empty punnets 26 were temporarily located beneath the feed belts 14, 16. It will therefore be understood that the weighing pans 24 would register the combined weight of the mushrooms in each punnet 26 located thereon, prompting a punnet 26 to be replaced before reaching the required predetermined weight. This particular configuration would therefore be less preferred than the embodiment hereinbefore described.

In a similar further mode of operation, an empty punnet 26 is only deposited from the respective magazine 44 onto the weighing pan 24 beside a full punnet 26 when said full punnet 26 is to be replaced. Each of the selectors 30 are in the lowered position during operation of the apparatus 10, and when a full punnett 26 is to be replaced, the selector 30 associated therewith is raised, and the transporter 25 driven across the base 12. Each of the lowered selectors 30 therefore maintain the respective punnets 26 in place beneath the feed belts 14, 16, while the full punnet 26 travels with the weighing pan 24 over the lateral conveyor 38. The raised selector 30 is then lowered ablout the empty punnet 26 located on the weighing pan 24, and the transporter 25 driven back across the base 12. As hereinbefore described, the full punnet 26 wil therefore be deposited onto the lateral conveyor 38, the corresponding empty punnet 26 being maintained beneath the feed belts 14, 16 in place of the full punnet 26.

The apparatus 10 is also provided with a power source (not shown), preferably a battery mounted therein, to allow the apparatus 10 to be driven by an operator between the rows of mushroom beds (not shown). As the mushroom beds (not shown) are conventionally quite narrow, the apparatus 10 may be provided with an array of sensors (not shown), such as proximity detectors (not shown) or the like, which are in operative association with the control unit 58 and arranged to automatically guide the apparatus 10 through the rows of mushroom beds (not shown) by steering the wheels 60 in response to information fed from the sensors (not shown).

Furthermore, as the passages (not shown) between the rows of mushrooms beds (not shown) are quite narrow, the facility to remove the storage compartment 54 permits the apparatus 10 to be turned around in a relatively confined space, thereby permitting the space within the mushroom house (not shown) to be maximised for the growing of mushrooms 62. Therefore, in use, when it is required to turn the apparatus 10, the storage compartment 54 is removed, the apparatus 10 turned, and the storage compartment 54 reconnected to permit the apparatus 10 to be restarted.

What is claimed is:

1. A mushroom packing apparatus comprising a grading conveyor; a plurality of locations distributed under a longitudinal axis of the grading conveyor, each location being provided with a container for collecting the mushrooms as they are deposited from the grading conveyor, the apparatus being arranged to weigh the respective container at each location; characterised in that each loaded container is replaced with an empty container once the respective loaded container has reached a predetermined weight by providing a transporter at each location, the transporter being in operative association with the respective container, the transporter being arranged to transfer the container, when loaded, laterally from beneath the grading conveyor with respect to the longitudinal axis, and to locate an empty container beneath the grading conveyor; and a lateral conveyor which runs adjacent each location, onto which lateral conveyor the transporter deposits the loaded containers, in order that the loaded containers be conveyed from the apparatus.

2. An apparatus according to claim 1 in which each location includes a weighing pan on which the respective container is seated.

3. An apparatus according to claim 2 in which each weighing pan is shaped and dimensioned to support an empty container adjacent the container being loaded, the transporter operable to reversibly displace the weighing pan such that the loaded container is transferred from beneath the grading conveyor, while the empty container is simultaneously transferred beneath the grading conveyor.

4. An apparatus according to claim 3 wherein each location includes a support table located above and out of contact with the respective weighing pan, the support table being in operative association with the transporter such that the support table is maintained above the weighing pan as the weighing pan is reversibly displaced.

5. An apparatus according to claim 3 wherein the apparatus includes a stop associated with each location, the stop arranged to engage the respective empty container when located beneath the grading conveyor, to hold the empty container beneath the grading conveyor as the transporter retracts the weighing pan.

6. An apparatus according to claim 5 wherein the stop is further arranged to engage the respective loaded container once the loaded container has been transferred from beneath the grading conveyor, to prevent the loaded container from being drawn back beneath the grading conveyor as the transporter retracts the weigh pan.

7. An apparatus according to claim 6 in which the apparatus is provided with a signal generator operable to alert an operator, once a predetermined number of empty containers within any of the magazines has been reached, that the respective magazine requires refilling.

8. An apparatus according to claim 1 in which the apparatus is provided with a magazine in operative association with each location, each magazine containing a number of empty containers, the magazine being adapted to deposit an empty container at the respective location as required.

9. An apparatus according to claim 1 in which the apparatus includes a storage compartment into which the lateral conveyor feeds the loaded containers.

10. An apparatus according to claim 9 in which the storage compartment is removably secured to the apparatus in order to facilitate the removal of the storage compartment once full.

11. An apparatus according to claim 10 in which the apparatus is mobile in order to permit the apparatus to be driven between the rows of mushroom beds.

12. An apparatus according to claim 11 which includes sensors adapted to guide the apparatus, as the apparatus is driven, between the rows of mushroom beds.

13. An apparatus according to claim 1 which is shaped and dimensioned to pass between adjacent rows of mushroom beds in a mushroom house.

14. An apparatus according to claim 1 which includes a controller adapted to halt the grading conveyor while any loaded container is being replace with an empty container, and to restart the grading conveyor once said replacement has been effected.

15. An apparatus according to claim 1 in which a warning signal is generated once a predetermined number of loaded containers have been deposited in the storage compartment.

* * * * *

UNITED STATES PATENT AND TRADEMARK OFFICE
CERTIFICATE OF CORRECTION

PATENT NO. : 6,955,031 B2
APPLICATION NO. : 10/363592
DATED : October 18, 2005
INVENTOR(S) : Ivan Doake and Neville Doake It is certified that error appears in the above-identified patent and that said Letters Patent is hereby corrected as shown below:

Column 10:
Line 28, Claim 6, "weigh" should be --weighing--.
Line 57, Claim 14, "replace" should be --replaced--.

Signed and Sealed this

Eighth Day of May, 2007

JON W. DUDAS
*Director of the United States Patent and Trademark Office*